UNITED STATES PATENT OFFICE.

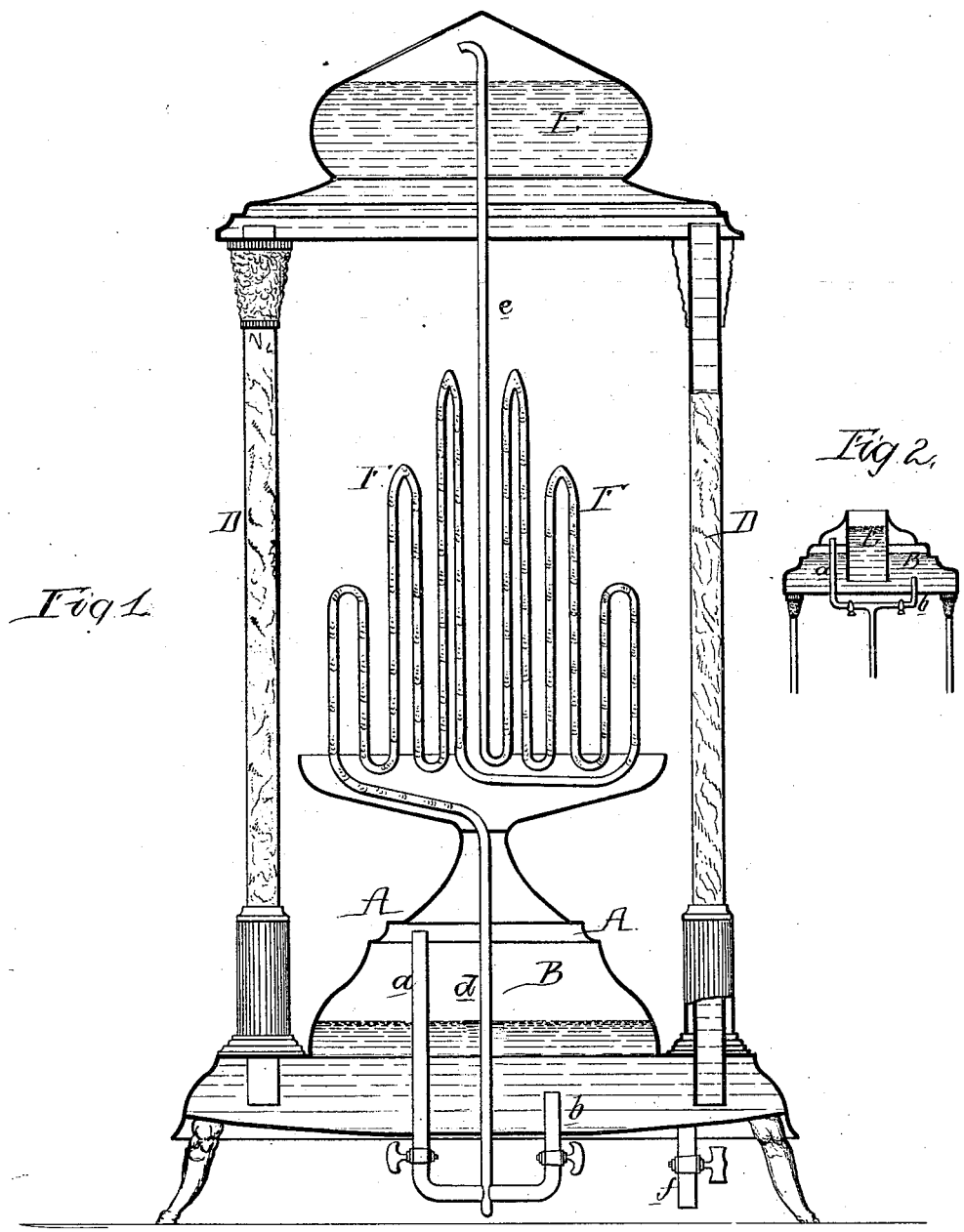

JOHN C. JOHNSON, OF PHILADELPHIA, PENNSYLVANIA.

IMPROVEMENT IN AERATED-WATER FOUNTAINS.

Specification forming part of Letters Patent No. 191,346, dated May 29, 1877; application filed April 16, 1877.

*To all whom it may concern:*

Be it known that I, JOHN C. JOHNSON, of Philadelphia, Pennsylvania, have invented a new and useful Improvement in Aerated-Water Fountains, of which the following is a specification:

My invention relates to an improvement in that class of fountains for which Letters Patent of the United States were granted to me on the 28th day of April, A. D. 1866, and the 28th day of May, 1872, respectively; the object of my present improvements being to render the fountain automatic and more compact and portable than heretofore. This object I attain in the manner which I will now proceed to describe, reference being had to the accompanying drawing, in which—

Figure 1 represents a vertical sectional view of my improved fountain.

A is the base of the fountain, which is hollow and incloses a chamber, B, the latter communicating, in the present instance, through the hollow supporting-columns D, with an elevated reservoir, E, which forms the top of the structure.

F is the fountain proper, and consists of a bent tube or series of tubes of glass, through which air and water under pressure are caused to pass, the rapid and continuous passage of the bubbles through the tubes producing a close resemblance to running water, as fully described in my former patents above referred to.

*a* is the pipe for supplying air, and *b* the pipe for supplying water, to the pipe *d*, through which the air and water pass before reaching the tubes of the fountain, the air in this pipe assuming the form of bubbles between drops of the water.

The discharge-pipe *e* of the fountain, in the present instance, extends up into the reservoir E, and terminates above the level of the water in the same.

Both of the pipes *a* and *b* are provided with suitable valves or cocks for regulating the passage of air and water through the same, and the chamber B is also provided with a valve discharge-pipe, *f*.

The operation of the fountain is as follows: Water being poured into the reservoir E descends through the columns D and enters the chamber B, in which it rises, compressing the air in the upper portion of the same to an extent dependent upon the height of the water in the reservoir E.

The valves in the pipes *a* and *b* are now opened, so as to permit the passage of air and water through the same to the extent necessary to produce the desired effect in the tubes of the fountain, after passing through which they are discharged from the pipe *e* into the reservoir E, the aeration of the water in this tube being sufficient to cause it to rise above the level of the water in the reservoir, so as to discharge freely.

This operation continues until the water rising in the chamber B, owing to the gradual exhaustion of the air, reaches the top of the pipe *a*, when the operation ceases.

The valve in the pipe *f* is now opened and the water drawn off, preparatory to being again poured into the reservoir E, in order to set the fountain again in operation.

The above-described fountain is automatic in its action, and, owing to the aeration of the water, but little of the latter is required to keep the fountain in running order, so that it may be made in compact and portable shape.

It is not necessary that the discharge-pipe *e* should communicate with the elevated reservoir E, as described, as it might, in some cases, discharge into a drip-pan suitably located.

In Fig. 2 is shown a modification of my invention, in which the water-reservoir E and compression-chamber B are combined in the structure, which forms the top of the fountain, the latter being arranged beneath. In this case the base of the fountain may form a receptacle for the drip-water.

I claim as my invention—

The combination, in an aerated-water fountain, of the elevated reservoir E, compression-chamber B, communicating with the same, the air and water pipes *a* and *b*, and fountain F, of the character described.

In testimony whereof I have signed my name to this specification in the presence of two subscribing witnesses.

JOHN C. JOHNSON.

Witnesses:
HERMANN MOESSNER,
HARRY SMITH.